United States Patent
Yakovleva et al.

(10) Patent No.: US 11,171,323 B2
(45) Date of Patent: Nov. 9, 2021

(54) STABILIZED LITHIUM METAL POWDER FOR LI-ION APPLICATION, COMPOSITION AND PROCESS

(71) Applicant: FMC Corporation, Philadelphia, PA (US)

(72) Inventors: Marina Yakovleva, Gastonia, NC (US); Yuan Gao, Greenwood Village, CO (US); Kenneth Brian Fitch, Cherryville, NC (US); Prakash Thyaga Palepu, Gastonia, NC (US); Yangxing Li, Belmont, NC (US); Christopher Jay Woltermann, Gastonia, NC (US)

(73) Assignee: FMC LITHIUM USA CORP., Philadelphia, PA (US)

( * ) Notice: Subject to any disclaimer, the term of this patent is extended or adjusted under 35 U.S.C. 154(b) by 368 days.

(21) Appl. No.: 15/975,470

(22) Filed: May 9, 2018

(65) Prior Publication Data
US 2018/0261829 A1    Sep. 13, 2018

Related U.S. Application Data

(63) Continuation of application No. 15/422,059, filed on Feb. 1, 2017, now abandoned, which is a continuation of application No. 12/198,313, filed on Aug. 26, 2008, now abandoned.

(60) Provisional application No. 60/969,267, filed on Aug. 31, 2007.

(51) Int. Cl.
| | | |
|---|---|---|
| *H01M 4/36* | (2006.01) |
| *H01M 4/134* | (2010.01) |
| *B22F 1/00* | (2006.01) |
| *B22F 9/06* | (2006.01) |
| *H01M 4/38* | (2006.01) |
| *H01M 10/0525* | (2010.01) |
| *B22F 1/02* | (2006.01) |
| *H01M 4/62* | (2006.01) |

(52) U.S. Cl.
CPC .......... *H01M 4/134* (2013.01); *B22F 1/0062* (2013.01); *B22F 1/02* (2013.01); *B22F 9/06* (2013.01); *H01M 4/382* (2013.01); *H01M 4/62* (2013.01); *H01M 10/0525* (2013.01); *B22F 2301/054* (2013.01); *B22F 2302/45* (2013.01); *H01M 4/364* (2013.01); *H01M 4/386* (2013.01); *H01M 4/387* (2013.01)

(58) Field of Classification Search
CPC ............ H01M 4/36; H01M 4/60; H01M 4/62; H01M 4/64; H01M 4/70; H01M 4/80; H01M 6/00
See application file for complete search history.

(56) References Cited

U.S. PATENT DOCUMENTS

2004/0018430 A1 *   1/2004   Holman .................. H01M 4/13
                                                                   429/233

OTHER PUBLICATIONS

"Surface characterization of emulsified lithium powder electrode", Hong et al., Electrochimica Acta 50 (2004) 535-539.*

* cited by examiner

*Primary Examiner* — Haidung D Nguyen
(74) *Attorney, Agent, or Firm* — F. Michael Sajovec; Williams Mullen

(57) ABSTRACT

The present invention provides a lithium metal powder protected by a substantially continuous layer of a polymer. Such a substantially continuous polymer layer provides improved protection such as compared to typical $CO_2$-passivation.

2 Claims, 12 Drawing Sheets

Example 9

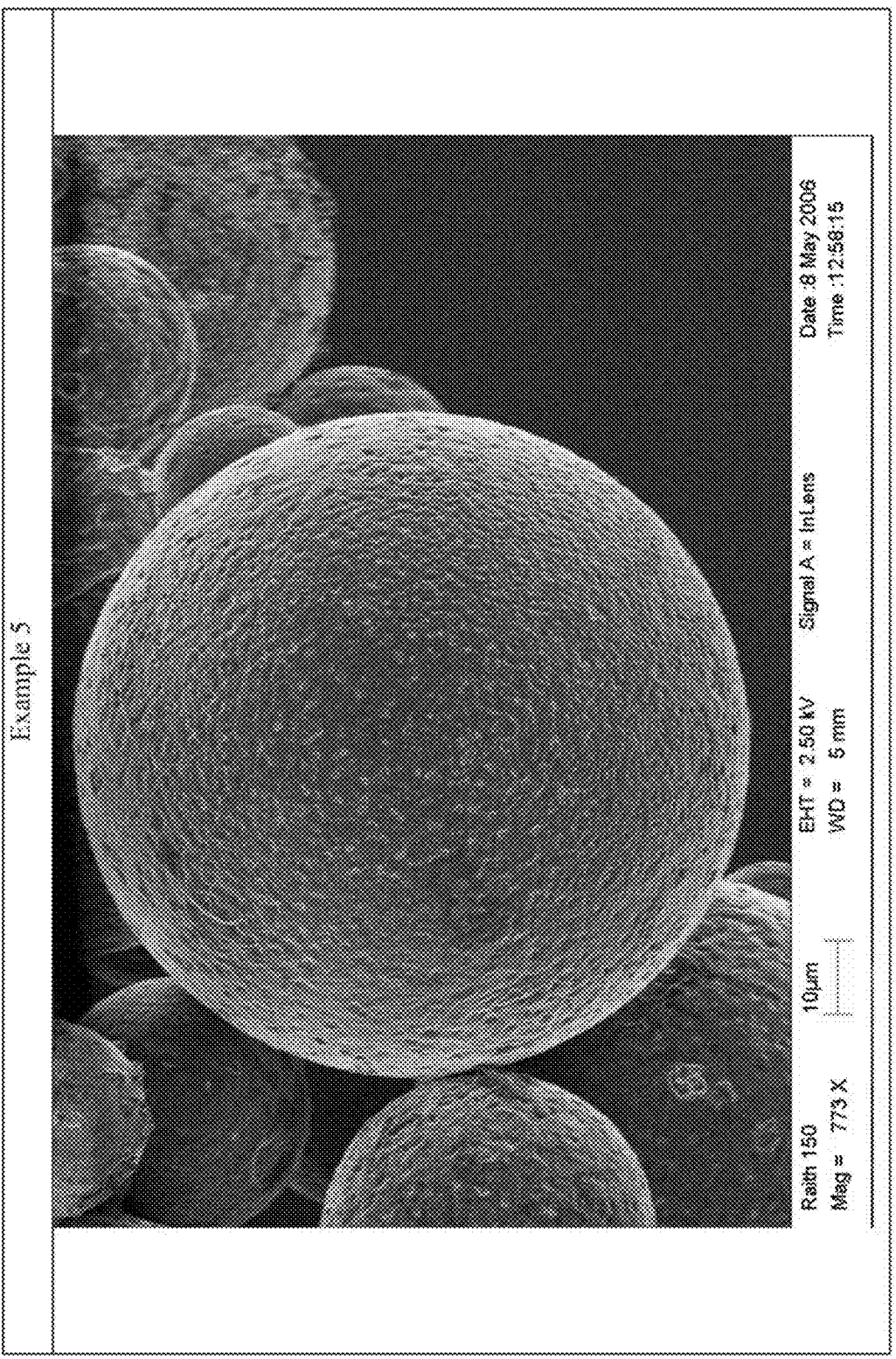
Figure 8B Example 5

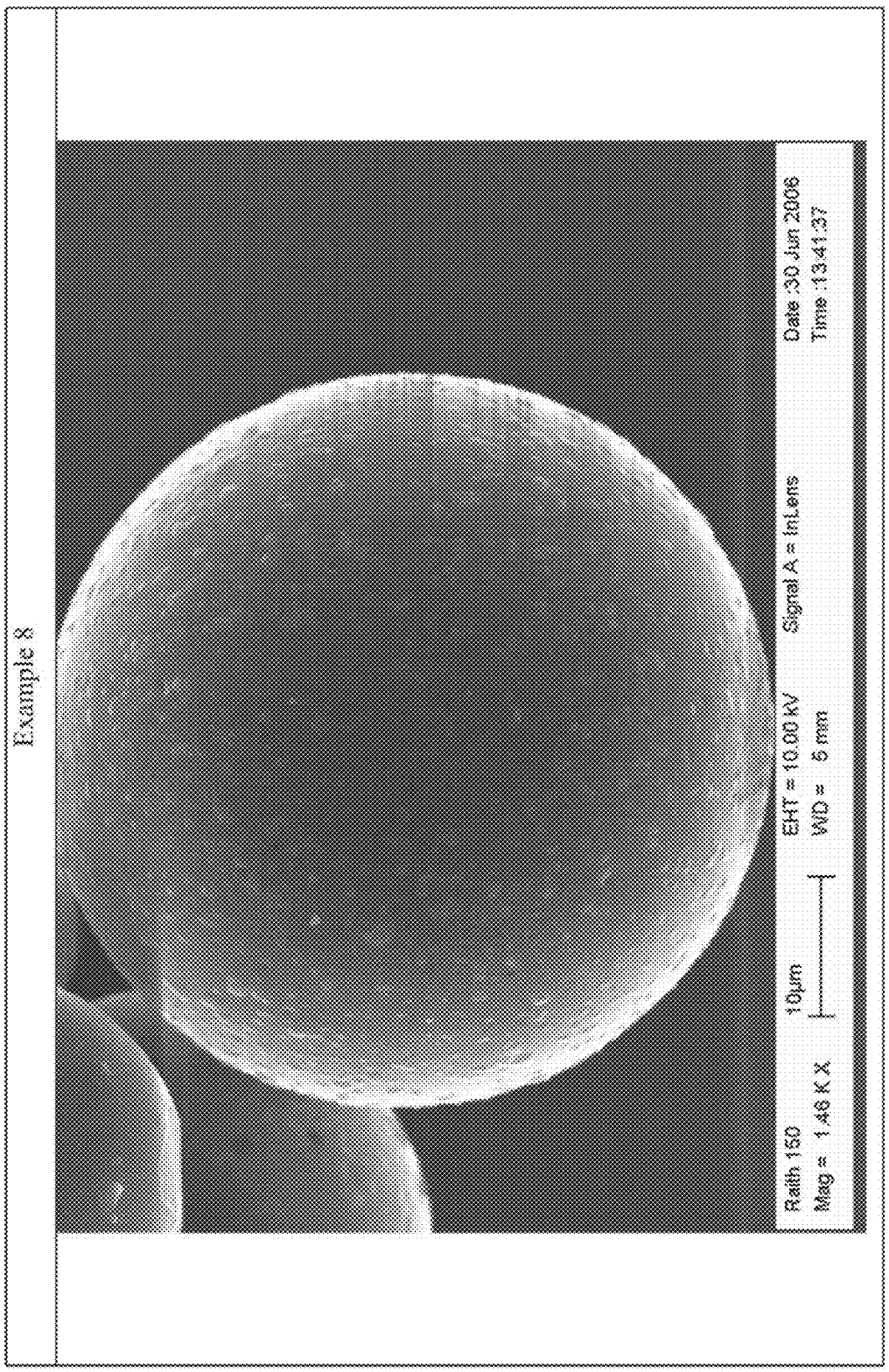

STABILIZED LITHIUM METAL POWDER FOR LI-ION APPLICATION, COMPOSITION AND PROCESS

CROSS-REFERENCE TO RELATED APPLICATIONS

This application is a continuation application of U.S. application Ser. No. 15/422,059 filed Feb. 1, 2017, currently pending, which is a continuation application of U.S. application Ser. No. 12/198,313, filed Aug. 26, 2008, currently pending, which claims benefit of, and incorporates herein by reference in its entirety, the following United States Provisional Application: U.S. Provisional Application No. 60/969,267, filed Aug. 31, 2007.

FIELD AND BACKGROUND OF THE INVENTION

The present invention relates to stabilized lithium metal powder ("SLMP") having improved air and solvent stability and having a longer storage life. Such improved SLMP can be used in a wide variety of applications including organometal and polymer synthesis, primary lithium batteries, rechargeable lithium batteries, and rechargeable lithium ion batteries.

Lithium and lithium-ion secondary or rechargeable batteries have recently found use in certain applications such as in cellular phones, camcorders, and laptop computers, and even more recently, in larger power applications such as in electric vehicles and hybrid electric vehicles. It is preferred in these applications that the secondary batteries have the highest specific capacity possible but still provide safe operating conditions and good cycleability so that the high specific capacity is maintained in subsequent recharging and discharging cycles.

Although there are various constructions for secondary batteries, each construction includes a positive electrode (or cathode), a negative electrode (or anode), a separator that separates the cathode and anode, and an electrolyte in electrochemical communication with the cathode and anode. For secondary lithium batteries, lithium ions are transferred from the anode to the cathode through the electrolyte when the secondary battery is being discharged, i.e., used for its specific application. During this process, electrons are collected from the anode and pass to the cathode through an external circuit.

When the secondary battery is being charged or recharged, the lithium ions are transferred from the cathode to the anode through the electrolyte.

Historically, secondary lithium batteries were produced using non-lithiated compounds having high specific capacities such as $TiS_2$, $MoS_2$, $MnO_2$ and $V_2O_5$, as the cathode active materials. These cathode active materials were often coupled with a lithium metal anode. When the secondary battery was discharged, lithium ions were transferred from the lithium metal anode to the cathode through the electrolyte. Unfortunately, upon cycling, the lithium metal developed dendrites that ultimately caused unsafe conditions in the battery. As a result, the production of these types of secondary batteries was stopped in the early 1990's in favor of lithium-ion batteries.

Lithium-ion batteries typically use lithium metal oxides such as $LiCoO_2$ and $LiNiO_2$ as cathode active materials coupled with a carbon-based anode. In these batteries, the lithium dendrite formation on the anode is avoided thereby making the battery safer. However, the lithium, the amount of which determines the battery capacity, is totally supplied from the cathode. This limits the choice of cathode active materials because the active materials must contain removable lithium. Furthermore, the delithiated products corresponding to $LiCoO_2$ and $LiNiO_2$ that are formed during charging (e.g. $Li_x CoO_2$ and $Li_x NiO_2$ where $0.4<x<1.0$) and overcharging (i.e. $Li_x CoO_2$ and $Li_x NiO_2$ where $x<0.4$) are not stable. In particular, these delithiated products tend to react with the electrolyte and generate heat, which raises safety concerns.

Another option is lithium metal. Lithium metal, particularly lithium metal powder; however, because of its high surface area, can be a deterrent for its use in a variety of applications because of its pyrophoric nature. It is known to stabilize lithium metal powder by passivating the metal powder surface with $CO_2$ such as described in U.S. Pat. Nos. 5,567,474, 5,776,369, and 5,976,403, the disclosures of which are incorporated herein in their entireties by reference. The $CO_2$-passivated lithium metal powder, however, can be used only in air with low moisture levels for a limited period of time before the lithium metal content decays because of the reaction of the lithium metal and air.

Thus there remains a need for stabilized lithium metal powder that has improved stability and storage life.

SUMMARY OF THE INVENTION

The present invention provides a lithium metal powder protected by a substantially continuous layer of a polymer. Such a substantially continuous polymer layer provides improved protection such as compared to typical $CO_2$-passivation. The resulting lithium metal powder has improved air and solvent stability and improved storage life. Furthermore, the polymer-protected lithium metal powder exhibits significantly better stability in N-methyl-2-pyrrolidone (NMP), which is commonly used as a slurry solvent in the electrode fabrication process, and reacts with unprotected lithium.

Objects and advantages of the present invention will become more apparent by describing various embodiments of the present invention with reference to the attached drawings.

BRIEF DESCRIPTION OF THE DRAWINGS

FIGS. 8A, 8B, and 8C are SEM images for samples prepared using different process parameters.

DETAILED DESCRIPTION OF THE INVENTION

Figure 1:
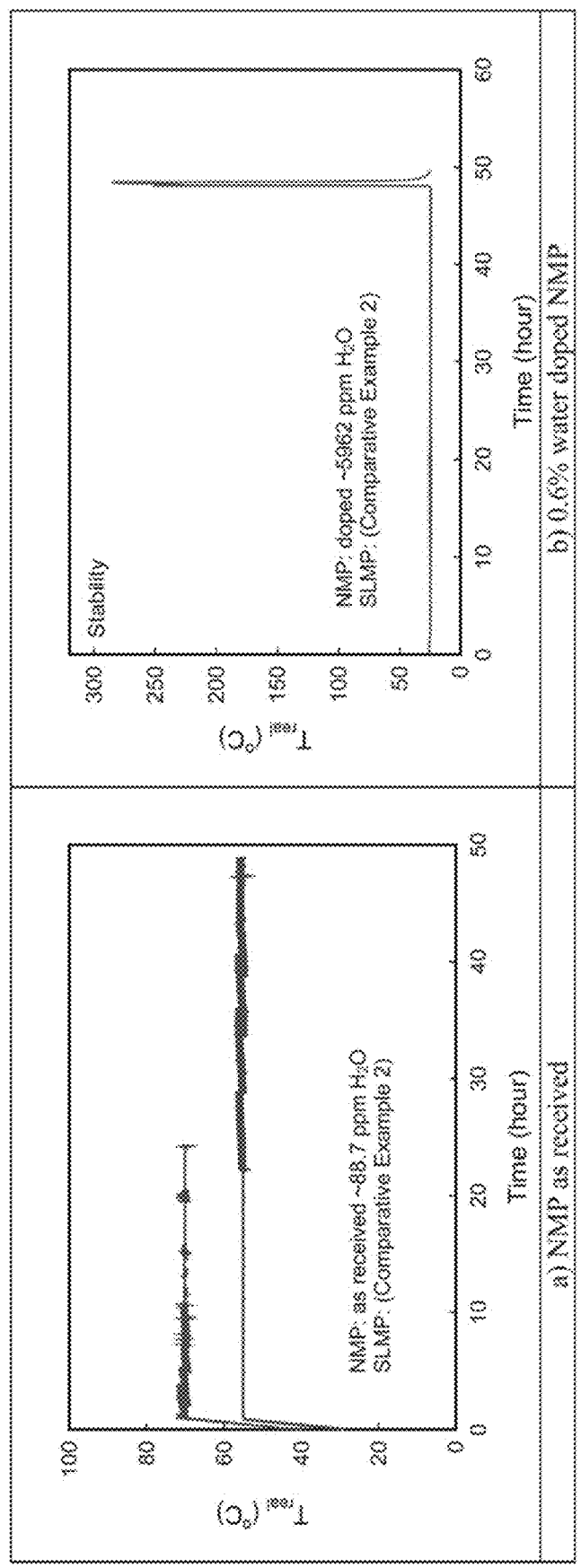
FIG. 1 is an ARSST stability test of $CO_2$-coated SLMP (comparative example 2) with NMP as received (<100 ppm moisture) and 0.6% water doped NMP.
Figure 2:
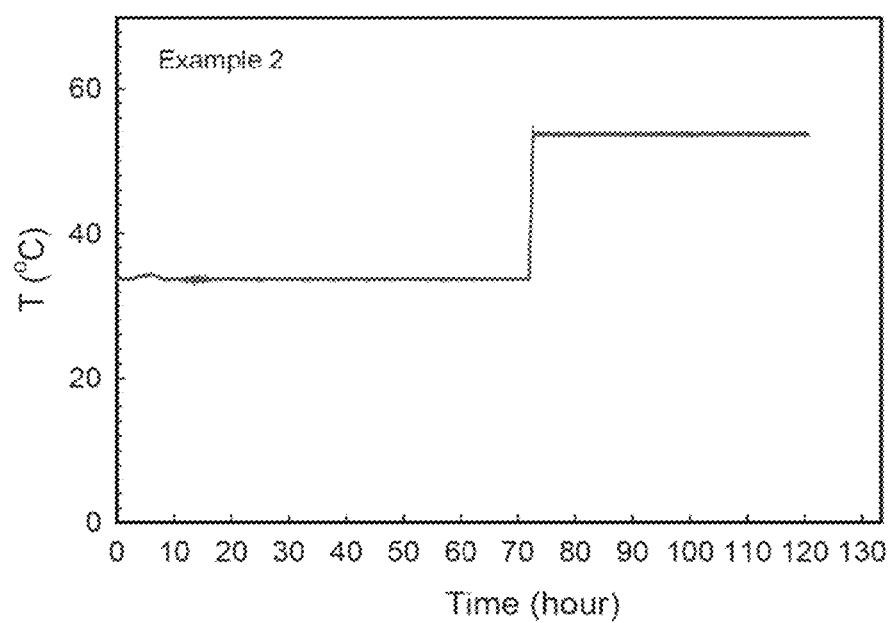
FIG. 2 is an ARSST stability test of PEO-coated SLMP (example 2) with 0.6% water doped NMP.
Figure 3:
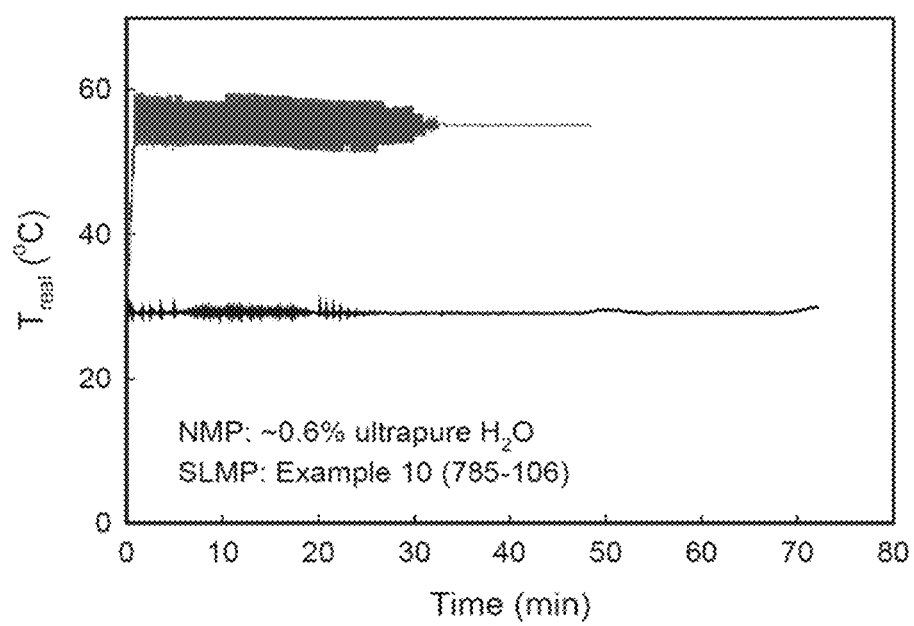
FIG. 3 is an ARSST stability test of EVA-coated SLMP with 0.6% water doped NMP, example 10.
Figure 4:
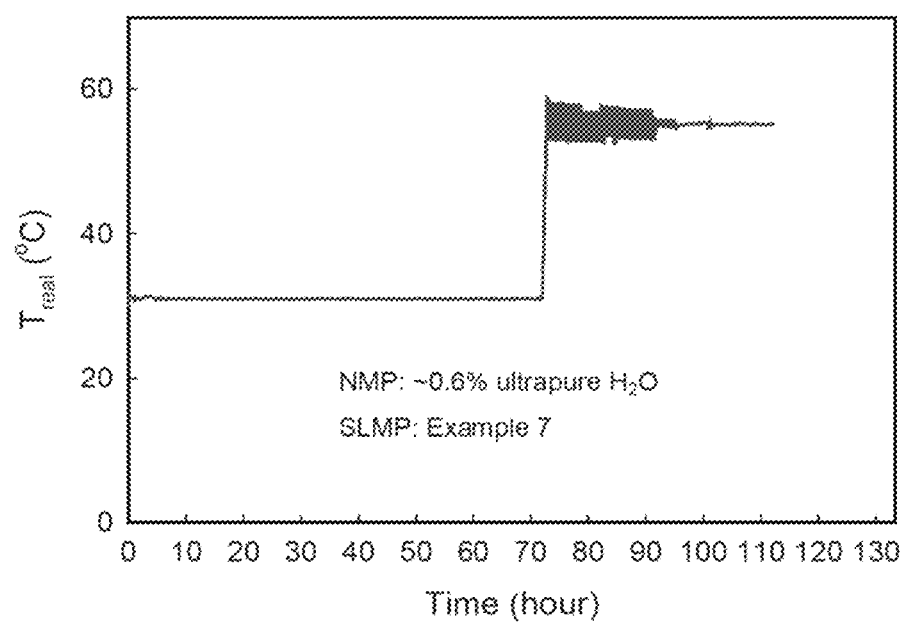
FIG. 4 is an ARSST stability test of SBR-coated SLMP with 0.6% water doped NMP, example 7.
Figure 5:
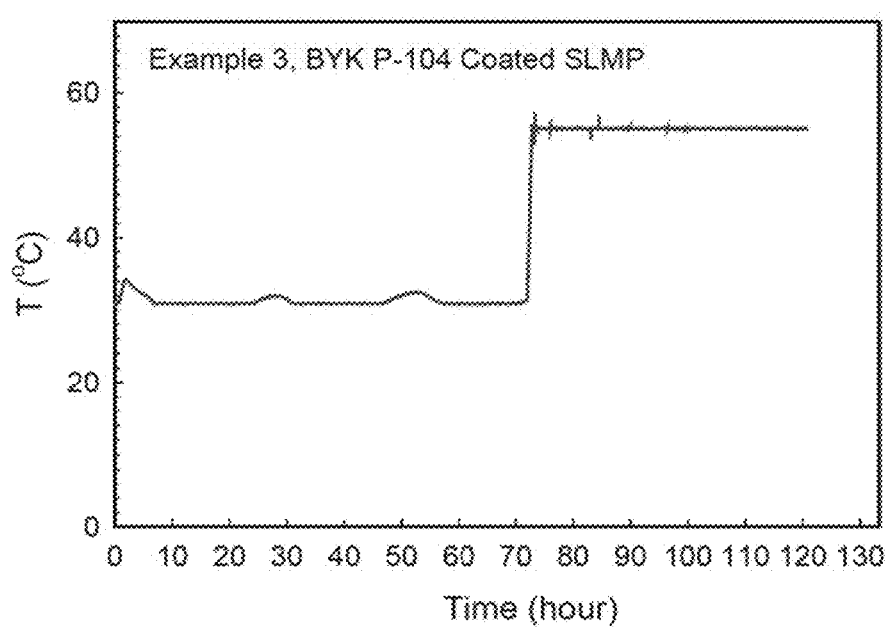
FIG. 5 is an ARSST stability test of BYK P 104-coated (low molecular weight polycarboxylic acid polymer) SLMP with 0.6% water doped NMP, example 3.

In the drawings and the following detailed description, various embodiments are described in detail to enable practice of the invention. Although the invention is described with reference to these specific embodiments, it will be understood that the invention is not limited to these embodiments. But to the contrary, the invention includes numerous alternatives, modifications and equivalents as will become apparent from consideration of the following detailed description and accompanying drawing.

The terminology used herein is for the purpose of describing particular embodiments only and is not intended to be limiting of the invention. As used herein, the term "and/or" includes any and all combinations of one or more of the associated listed items. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, the term "about," as used herein when referring to a measurable value such as an amount of a compound or agent of this invention, dose, time, temperature, and the like, is meant to encompass variations of 20%, 10%, 5%, 1%, 0.5%, or even 0.1% of the specified amount.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All publications, patent applications, patents, and other references mentioned herein are incorporated by reference in their entirety. However, the citation of a reference herein should not be construed as an acknowledgement that such reference is prior art to the present invention described herein.

In accordance with the present invention, lithium dispersions are prepared by heating the lithium metal powder in a hydrocarbon oil to a temperature above its melting point, subjecting to conditions sufficient to disperse the molten lithium, agitating or stirring vigorously, and contacting the lithium metal powder with a polymer at a temperature that is between this temperature and at or above the melting point of the lithium to provide a substantially continuous layer of the polymer. The substantially continuous layer of polymer has a thickness of 25 to 200 nm, and often has a thickness of 80 to 120 nm. Other alkali metals such as sodium and potassium can be coated according to the present invention.

Suitable polymers can be polymers that are water resistant and that are lithium-ion conducting or non-lithium ion conducting, for example if they are soluble in the common electrolyte solvents. The polymers may be reactive with lithium or non-reactive with lithium. The following are merely examples of the polymer compounds and include: polyurethanes, polytetrafluoroethylene, polyvinyl fluoride, polyvinyl chloride, polystyrenes, polyethylenes, polypropylene, polyformaldehyde (Delrin), styrene-butadiene-styrene block polymers, ethylene vinyl acetate, ethylene acrylic acid copolymers, polyethylene oxide, polyimides, polythiophenes, poly(para-phenylene), polyanilines, poly(p-phenylenevinylene), silica titania copolymers, unsaturated polycarboxylic acid polymer and polysiloxane copolymers, etc.

The polymer can be introduced to contact the lithium droplets during the dispersion, or at a lower temperature after the lithium dispersion has cooled. It is understood that combinations of different types of polymers with different chemical compositions, molecular weights, melting points and hardness could be used to achieve specific coating characteristics for particular applications. For example, degree of stickiness could be controlled to allow introduction of the SLMP using "transfer release paper" concept, where certain degree of stickiness is required. It is also understood that the monomers could be used to create an in-situ polymer coating on the surface of the lithium particles.

Furthermore, it is beneficial to combine polymer or polymer mixtures with some inorganic coating, for example, $Li_2CO_3$, $LiF$, $Li_3PO_4$, $SiO_2$, $Li_4SiO_4$, $LiAlO_2$, $Li_2TiO_3$, $LiNbO_3$, $Al_2O_3$, $SiO_2$, $SnO_2$, $ZrO_2$, and the like, to improve both air stability and polar solvent stability that would allow both safer handling and possibility of using commonly used polar solvents that dissolve commonly used polymer binders. It is recognized that most polymers are soluble in non-polar solvents at elevated temperatures and solubility at room temperature could be significant (see, Table 2) and washing solvents used to remove oil from the particles should be selected appropriately. Sometimes, dry non-stabilized or stabilized powders could be transferred into non-polar solvents that are compatible with lithium and polymer coatings could be deposited using for example, rotovap techniques, thus avoiding solubility issue.

Suitable polymers described above, could produce two types of coatings on lithium particles: first type representing physical or adhesive type and second, representing chemically bonded coatings where polymers with functional groups, are used. For example, polyethylene (PE), polypropylene (PP), and polystyrene (PS) contain carbon-hydrogen groups that do not react with Li. This type of polymer is valuable as a coating reagent for lithium particles in that the physical Van der Waals interaction allows carbon-hydrogen molecules to adhere onto the surface of lithium particles. On the other hand, polymers such as, for example, poly(acrylic acid) and ethylene vinyl acetate do react with lithium since they contain the acid functional groups, thus forming a chemically bonded coating.

Figure 7:
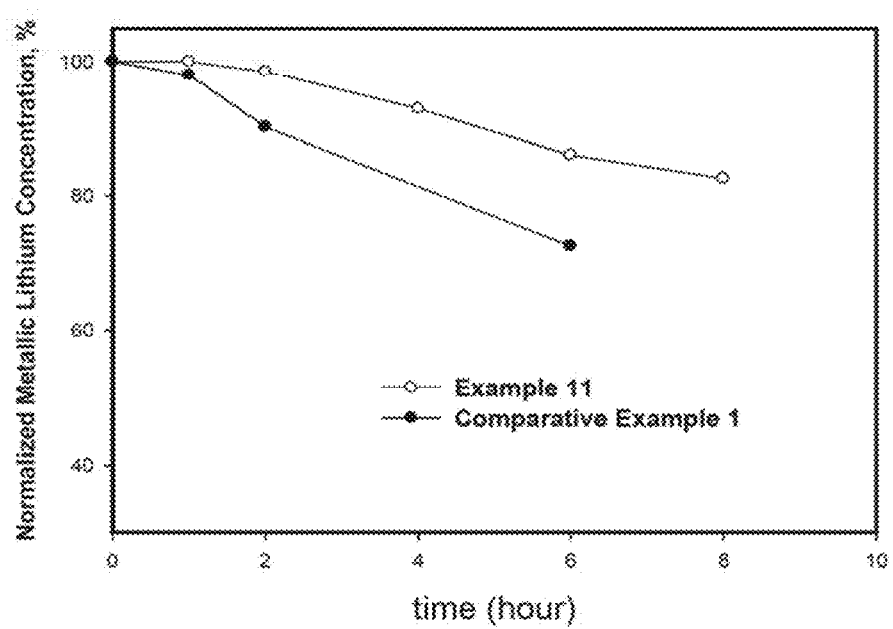
FIG. 7 is an ARSST stability test of $CO_2$-coated SLMP and Example 11.

By altering the processes and process parameters and the order of the reagents addition in polymer-coated lithium particles can result with distinct surface properties. Different process parameters can result in samples with different surface properties (see, FIG. 7). Polymers or polymer mixtures could be introduced above the melting point of lithium before or after other dispersants (e.g., wax) and coating reagents additions to enhance the chemical bonding and uniformity of protecting layer by changing the reaction interfaces. The cooling profile, the temperature at which the polymer is introduced during the dispersion process could be used to control degree of crystallinity and obtain samples with pre-determined degree of stickiness.

The following examples are merely illustrative of the invention, and are not limiting thereon.

EXAMPLES

Comparative Example 1

Battery grade lithium metal (405 g) was cut into 2×2 inch pieces and charged under constant flow of dry argon at room temperature to a 3 liter stainless steel flask reactor with a 4" top fitted with a stirring shaft connected to a fixed high speed stirrer motor. The reactor was equipped with top and bottom heating mantles. The reactor was then assembled and 1041.4 g of Penetek™ oil (Penreco, Division of the Penzoil Products Company) was added. The reactor was then heated to about 200° C. and gentle stirring was maintained in the range of 250 rpm to 800 rpm to ensure all metal was molten, argon flow was maintained throughout the heating step. Then the mixture was stirred at high speed (up to 10,000 rpm) for 2 minutes. Oleic acid, 8.1 g was charged into the reactor and high speed stirring continued for another 3 minutes followed by the 5.1 g $CO_2$ addition. Then the high speed stirring was stopped, heating mantles removed and dispersion was allowed to cool to about 50° C. and transferred to the storage bottles. Further, lithium dispersion was filtered and washed three times with hexane and once with n-pentane in an enclosed, sintered glass filter funnel to remove the hydrocarbon oil medium while under argon flow. The funnel was heated with a heat gun to remove traces of the solvents and the resulting free-flowing powder was transferred to a tightly capped storage bottles.

Comparative Example 2

Penetek™ mineral oil (4449 g) and 1724 g of battery grade lithium metal were added to a 15 liter jacketed dispersion reactor under an argon atmosphere at room temperature. The reactor was then heated from room temperature to 200° C. by pumping hot heat transfer fluid through the jacket. During heating the dispersion agitator was kept at low speed to facilitate heat transfer. Once the temperature inside the reactor reached 200° C., the dispersion agitator speed was increased to 5000 rpm. After 3.5 minutes of high speed stirring, 36 g of oleic acid was charged into the reactor and high speed stirring continued for another 4.5 minutes followed by addition of 22 g of CO2 gas. After an additional 4 minutes of high speed stirring, the high speed agitator was turned off and the reactor contents were brought down to room temperature. During the cooling process, the dispersion was kept in suspension using low speed agitation. Lithium dispersion was transferred under argon pressure to a batch filter and the mineral oil was allowed to drain out. The dispersion in the filter was washed four times with hexane; then dry argon was blown through the filter to remove any remaining volatile organics. The dry stabilized polymer coated lithium dispersion was removed from the filter as a final product.

Example 1

A lithium dispersion (47.30 g) passivated with $CO_2$ gas in oil (27.5%) containing 13.01 g of lithium with a medium particle size of 45 micron was charged into 120 ml hastelloy can equipped with a 1" Teflon coated stir bar. 1.3 g of PEO (Polyox WSR N80) dry powder was also added to the can. The solution was heated from ambient to 75° C. at a rate of 5° C./min and held for 10 minutes. The sample was further heated from 75° C. to 175° C. at 5° C./min and held for one hour. This mixture was continuously stirred at 200 rpm during the heating phase. Sample was allowed to cool to room temperature and transferred to the storage bottle. Further, lithium dispersion was filtered and washed three times with hexane in an enclosed, sintered glass filter funnel and twice with n-pentane to remove the hydrocarbon oil medium. The funnel was heated with a heat gun to remove traces of the solvents and the resulting free-flowing powder was transferred to tightly capped storage bottles.

Example 2

A lithium dispersion (45.00 g) passivated with $CO_2$ gas in oil (27.5.%) containing 12.37 g of lithium with a medium particle size of 45 micron was charged into 120 ml hastelloy can equipped with a 1" Teflon coated stir bar. 1.2 g of PEO (Polyox WSR N80) dry powder was also added to the can. The solution was heated from ambient to 75° C. at a rate of 5° C./min and held for 10 minutes. The sample was further heated from 75° C. to 175° C. at 5° C./min and held for one hour. Finally the sample was heated from 175° C. to 200° C. at 20° C./min. This mixture was continuously stirred at 200 rpm during the heating phase. Sample was allowed to cool to room temperature and transferred to a storage bottle. Further, lithium dispersion was filtered and washed three times with hexane and twice with n-pentane in an enclosed, sintered glass filter funnel to remove the hydrocarbon oil medium. The funnel was heated with a heat gun to remove traces of the solvents and the resulting free-flowing powder was transferred to tightly capped storage bottles.

Example 3

A lithium dispersion (44.00 g) passivated with $CO_2$ gas in oil (27.5%) containing 12.10 g of lithium with a medium particle size of 45 micron was charged into 120 ml hastelloy can equipped with a 1" Teflon coated stir bar. The solution was heated to 75° C. and 1.2 ml of BYK-P 104 S (BYK Chemie) was added to the lithium dispersion. This mixture was continuously stirred at 200 rpm for one hour. Sample was allowed to cool to room temperature and transferred to a storage bottle. Further, lithium dispersion was filtered and washed three times with hexane and twice with n-pentane in an enclosed, sintered glass filter funnel to remove the hydrocarbon oil medium. The funnel was heated with a heat gun to remove traces of the solvents and the resulting free-flowing powder was transferred to tightly capped storage bottles.

Example 4

A stabilized lithium dispersion (54.99 g) in oil (11.275%) containing 6.20 g of lithium with a medium particle size of 58 micron was charged into 120 ml hastelloy can equipped with a 1" Teflon coated stir bar. At ambient temperature 0.62 g of SBR in a form of 10% solution in p-xylene (Aldrich) was added to the lithium dispersion. This mixture was continuously stirred at 200 rpm for 19 hours. Sample was transferred to a storage bottle. Further, lithium dispersion was filtered and washed three times with hexane and twice with n-pentane in an enclosed, sintered glass filter funnel to remove the hydrocarbon oil medium. The funnel was heated with a heat gun to remove traces of the solvents and the resulting free-flowing powder was transferred to tightly capped storage bottles.

Example 5

A stabilized lithium dispersion (54.68 g) in oil (11.275%) containing 6.17 g of lithium with a medium particle size of 58 micron was charged into 120 ml hastelloy can equipped with a 1" Teflon coated stir bar. At ambient temperature 0.62 g of EVA (Aldrich) in a form of 5% solution in p-xylene (Aldrich) pre-dissolved was added to the lithium dispersion. This mixture was continuously stirred at 200 rpm for 2.5 hours. Sample was transferred to a storage bottle. Further, lithium dispersion was filtered and washed three times with hexane and twice with n-pentane in an enclosed, sintered glass filter funnel to remove the hydrocarbon oil medium. The funnel was heated with a heat gun to remove traces of the solvents and the resulting free-flowing powder was transferred to tightly capped storage bottles.

Example 6

A stabilized lithium dispersion (54.00 g) in oil (11.275%) containing 6.09 g of lithium with a medium particle size of 58 micron was charged into 120 ml hastelloy can equipped with a 1" Teflon coated stir bar. At ambient temperature 0.5 ml of butadiene (Aldrich) and 0.5 ml of styrene (Aldrich) were added to the lithium dispersion. This mixture was continuously stirred at 200 rpm for 1 hour. Sample was transferred to a storage bottle. Further, lithium dispersion was filtered and washed three times with hexane and twice with n-pentane in an enclosed, sintered glass filter funnel to remove the hydrocarbon oil medium. The funnel was heated with a heat gun to remove traces of the solvents and the resulting free-flowing powder was transferred to tightly capped storage bottles.

Example 7

10.0 g of SLMP (stabilized lithium metal powder) was weighed into a 1 liter round bottom flask. 32.1 g of p-xylene (Aldrich) and 0.28 g SBR in a form of 10% solution in p-xylene (Aldrich) pre-dissolved were added to the flask. The flask containing the mixture was attached to a rotavap vacuum extractor and heated with rotation to 70° C. After holding the temperature at 70° C. for 15 minutes vacuum was applied to strip the solvent. The sample was then transferred to a storage bottle.

Example 8

4.0 g of non-stabilized lithium powder with a medium particle size of 58 micron and 36 g p-xylene (Aldrich) were charged into 120 ml hastelloy can equipped with a 1" Teflon coated stir bar. This mixture was heated to 40° C. while mixing at 200 rpm. At 40° C., 0.40 g of EVA in a form of 10% solution in p-xylene (Aldrich) pre-dissolved was added to the lithium, p-xylene mixture. This mixture was continuously stirred at 200 rpm for 20 hours. Sample was transferred to a 200 ml round bottom flask. Further, the p-xylene was evaporated away by passing dry argon over the sample. The resulting free-flowing powder was transferred to a tightly capped storage bottle.

Example 9

A stabilized lithium dispersion (2149.8 g) in oil (11.0%) containing 236.5 g of lithium with a medium particle size of 58 micron was charged into 3 liter round bottom flask equipped with a propeller type variable speed mixer. At ambient temperature 23.8 g EVA (Aldrich) in a form of 10% solution in p-xylene (Aldrich) was added to the lithium dispersion. This mixture was continuously stirred at 500 rpm for 4 hours. Sample was transferred to a storage bottle. Further, lithium dispersion was filtered and washed three times with hexane and twice with n-pentane in an enclosed, sintered glass filter funnel to remove the hydrocarbon oil medium. The funnel was heated with a heat gun to remove traces of the solvents and the resulting free-flowing powder was transferred to tightly capped storage bottles.

Example 10

A stabilized lithium dispersion (1127.0 g) in oil (11.2%) containing 126.6 g of lithium with a medium particle size of 63 micron was charged into 5 liter round bottom flask equipped with a propeller type variable speed mixer. The temperature was raised to 41.3° C. and 12.5 g EVA (Aldrich) in a form of 5% solution in p-xylene (Aldrich) was added to the lithium dispersion. This mixture was continuously stirred at 500 rpm for about 6 hours at 40° C. and then for another ~18 hours at the ambient temperature. Sample was transferred to a storage bottle. Further, lithium dispersion was filtered and washed three times with hexane and twice with n-pentane in an enclosed, sintered glass filter funnel to remove the hydrocarbon oil medium. The funnel was heated with a heat gun to remove traces of the solvents and the resulting free-flowing powder was transferred to tightly capped storage bottles.

Example 11

Penetek™ mineral oil 15390 g of and 4415 g of battery grade lithium metal were added to a 57 liter jacketed dispersion reactor under an argon atmosphere at room temperature. The reactor was then heated from room temperature to 190° C. by pumping hot heat transfer fluid through the jacket. During heating the dispersion agitator was kept at low speed to facilitate heat transfer to the reactor contents. Once the temperature inside the reactor reached 190° C., the dispersion agitator speed was increased to 4800 rpm. After three minutes of high speed stirring, 90 g of oleic acid was charged into the reactor and high speed stirring continued for another four minutes followed by addition of 56 grams of $CO_2$ gas. After an additional six minutes of high speed stirring, 154 g of polyethylene oxide (PEO) granules were added to the reactor and high speed stirring continued for three more minutes. Then the high speed agitator was turned off and the reactor contents were brought down to room temperature. During the cooling process, the dispersion was kept in suspension using low speed agitation. The lithium dispersion was transferred under argon pressure to a batch filter and the mineral oil was allowed to drain out under argon pressure. The dispersion was washed four times with hexane; then dry argon was blown through the filter to remove any remaining volatile organics. The dry stabilized polymer coated lithium dispersion was removed from the filter as a final product.

Figure 6:
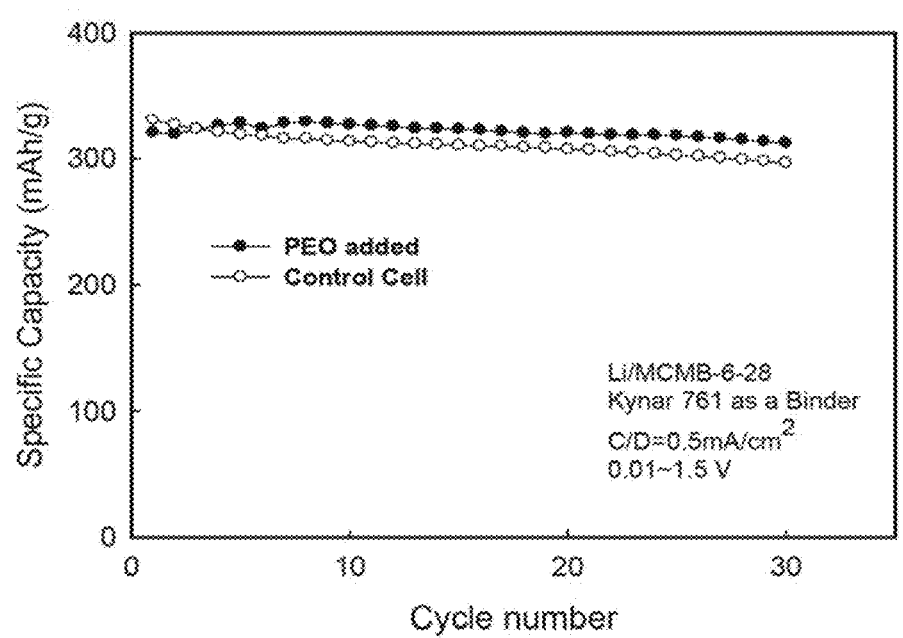
FIG. 6 demonstrates the effect of a polymer-coated lithium on the electrochemical performance
Figure 8A:
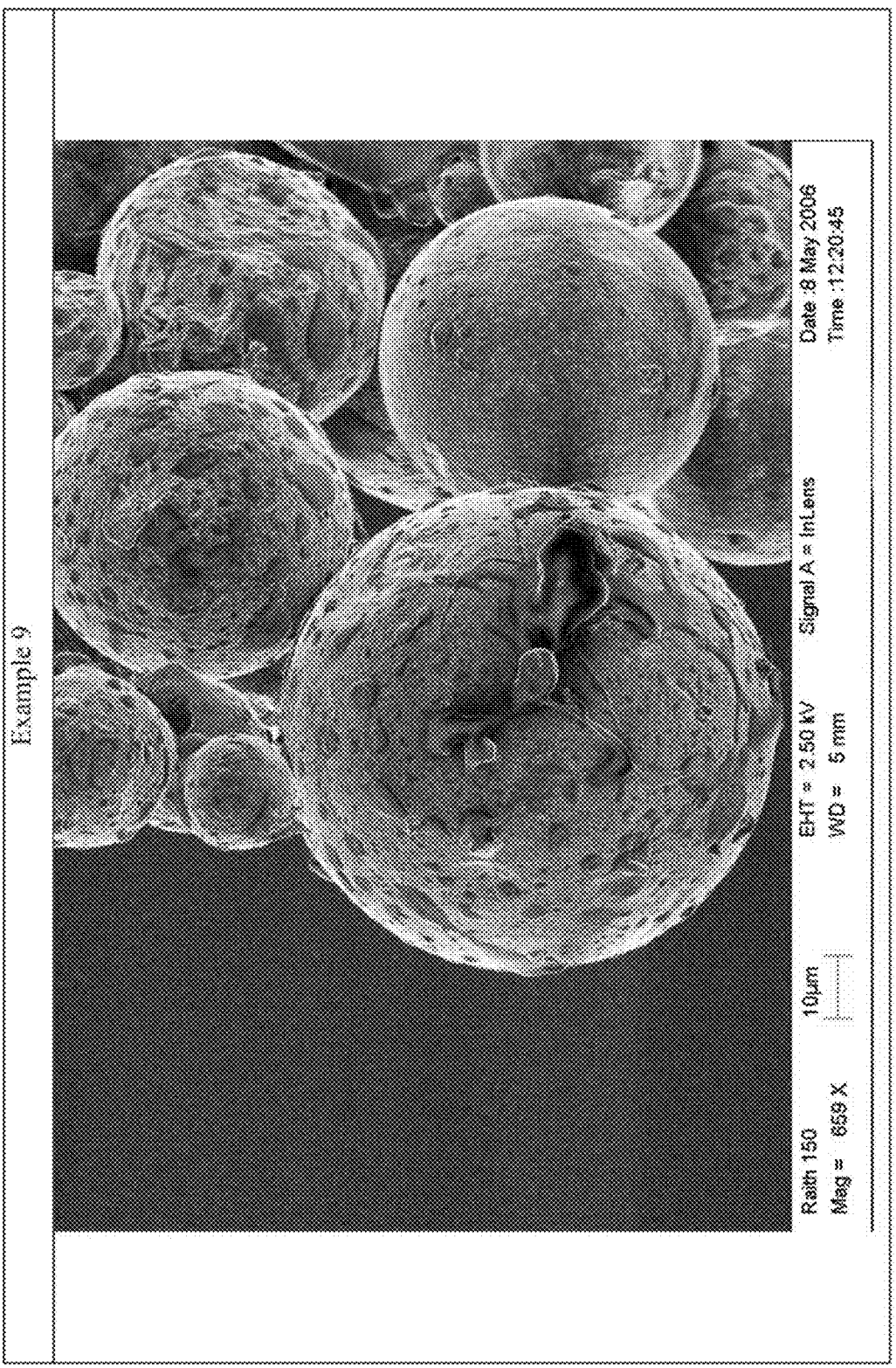
Figure 9A:
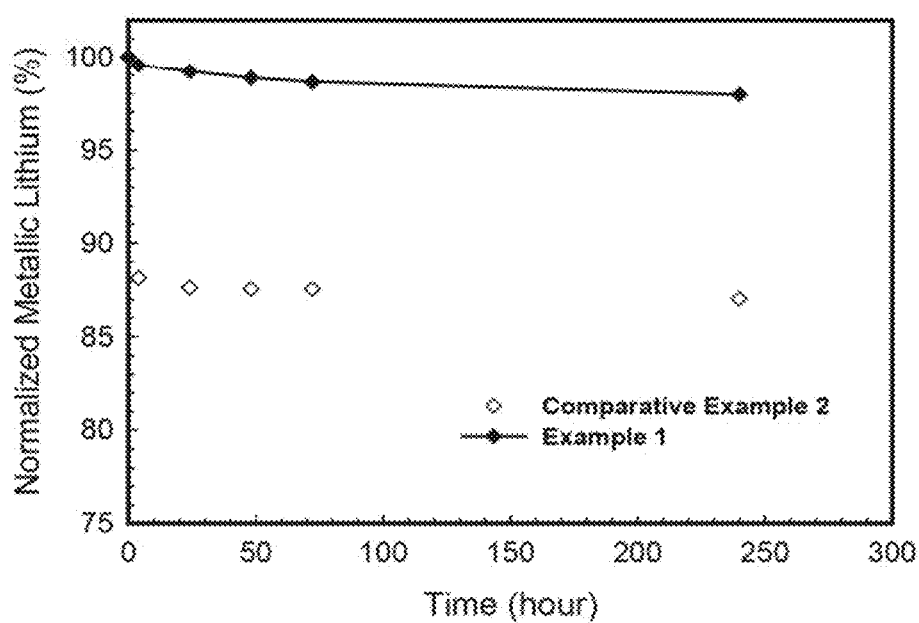
FIG. 9A is a comparison of metallic lithium concentration in anhydrous NMP as a function of time.
Figure 9B:
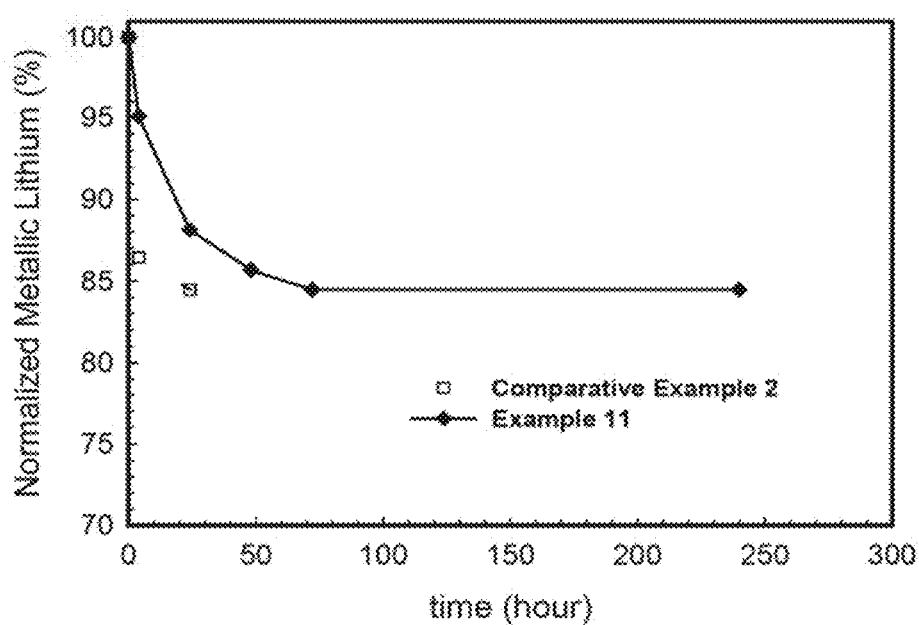
FIG. 9B is a comparison of metallic lithium concentration in 0.6% water doped NMP as a function of time.

FIGS. 1-5 and 7 below demonstrate stability of the polymer-coated samples in NMP, which is widely used as a solvent in the electrode fabrication process in the rechargeable lithium-ion battery industry. The following procedure is used to conduct this test: SLMP and solvent are loaded into the test cell under Argon, then the test cell is brought up to 25° C. and isothermal hold continues for 72 hours, then the temperature is ramped up to 55° C. and isothermal hold continues for 48 hours; the mixture is continuously stirred. The metallic lithium content of samples is measured upon completion of the test: the higher the content the better protecting properties of the coating are. As could be seen in Table 1 below, the lithium concentration is 17.3% and higher for the samples in the presented examples. No adverse effects on electrochemical properties of polymer additive to graphite electrode were observed. (See FIG. 6.) FIGS. 8A, 8B, and 8C show the different surface properties of Examples 5, 8, and 9 due to process parameter changes. A separate test was conducted to determine lithium content as a function of time with water doped NMP and significant improvement was observed. (See, FIGS. 9A and 9B.)

TABLE 1

Examples of the residual metallic lithium concentration measured using standard ARSST test with the 0.6% water doped NMP

| Coating agent | Example | Residual metallic Lithium concentration |
|---|---|---|
| EVA | Example 10 (785-106) | 24.3% |
| SBR | Example 7 (767-200) | 17.3% |
| PEO | Example 1 (PEOR043007) | 38.2% |
| PEO | Example 2 (PEOR050807) | 30.9% |

TABLE 2

Examples of polymer's solubility in selected solvents

| | LuWax A | SBR | EVA | PEO |
|---|---|---|---|---|
| Hexane | 0.46% | 3.92% | 1.21% | 0.03% |
| Pentane | 0.48% | 4.1% | 0.46% | 0.03% |
| Xylene | 0.81% | >10% | >10% | >10% |

Having thus described certain embodiments of the present invention, it is to be understood that the invention defined by the appended claims is not to be limited by particular details set forth in the above description as many apparent variations thereof are possible without departing from the spirit or scope thereof as hereinafter claimed. The following claims are provided to ensure that the present application meets all statutory requirements as a priority application in all jurisdictions and shall not be construed as setting forth the full scope of the present invention.

The invention claimed is:

1. An anode comprising a host material capable of absorbing or desorbing lithium in an electrochemical system and a polymer-coated stabilized lithium metal powder dispersed in the host material, wherein the stabilized lithium metal powder is coated with a continuous polymer layer having a thickness of 25 to 200 nm and the polymer is selected from the group consisting of polyurethanes, polytetrafluoroethylene, polyvinyl fluoride, polyvinyl chloride, polystyrenes, polyethylenes, polypropylenes, polyformaldehyde, styrene-butadiene-styrene block polymers, ethylene vinyl acetate, ethylene acrylic acid copolymers, polyethylene oxide, polyimides, polythiophenes, poly(para-phenylene), polyaniline, poly(p-phenylenevinylene), silica titania-based copolymers, unsaturated polycarboxylic acids and polysiloxanes.

2. An anode according to claim 1, wherein the stabilized lithium metal powder further includes an inorganic coating layer.

* * * * *